(12) United States Patent
Pelella et al.

(10) Patent No.: US 12,201,922 B2
(45) Date of Patent: Jan. 21, 2025

(54) METHOD FOR OPERATING A CHROMATOGRAPHY SETUP

(71) Applicant: Sartorius Stedim Chromatography Systems Ltd., Royston (GB)

(72) Inventors: Fabrizio Pelella, Royston (GB); Jason Forte, Royston (GB); Mark Allen Pagkaliwangan, Royston (GB)

(73) Assignee: Sartorius Stedim Chromatography Systems Ltd., Royston (GB)

( * ) Notice: Subject to any disclaimer, the term of this patent is extended or adjusted under 35 U.S.C. 154(b) by 379 days.

(21) Appl. No.: 17/687,237

(22) Filed: Mar. 4, 2022

(65) Prior Publication Data

US 2023/0277958 A1    Sep. 7, 2023

(51) Int. Cl.
| | |
|---|---|
| *B01D 15/18* | (2006.01) |
| *B01D 15/14* | (2006.01) |
| *B01D 15/22* | (2006.01) |
| *G01N 30/20* | (2006.01) |
| *G01N 30/26* | (2006.01) |
| *G01N 30/46* | (2006.01) |

(Continued)

(52) U.S. Cl.
CPC ......... *B01D 15/1828* (2013.01); *B01D 15/14* (2013.01); *B01D 15/1821* (2013.01); *B01D 15/1842* (2013.01); *B01D 15/1864* (2013.01); *B01D 15/22* (2013.01); *G01N 30/26* (2013.01); *G01N 30/46* (2013.01); *G01N 30/88* (2013.01); *G01N 2030/8804* (2013.01)

(58) Field of Classification Search
CPC .............. B01D 15/1828; B01D 15/14; B01D 15/1842; B01D 15/1864; B01D 15/22; B01D 15/1821; G01N 30/88; G01N 30/26; G01N 30/46; G01N 2030/8804
See application file for complete search history.

(56) References Cited

U.S. PATENT DOCUMENTS

| | | | | |
|---|---|---|---|---|
| 7,846,335 B2 * | 12/2010 | Bisschops | .............. | G01N 30/20 210/656 |
| 10,888,799 B2 * | 1/2021 | Gebauer | ................ | G01N 30/88 |

FOREIGN PATENT DOCUMENTS

| | | |
|---|---|---|
| EP | 1775001 | 4/2007 |
| EP | 3845626 | 7/2021 |

(Continued)

OTHER PUBLICATIONS

"International Preliminary Report on Patentability," for PCT Patent Application No. PCT/EP2023/054448 mailed Sep. 20, 2024 (6 pages).

*Primary Examiner* — Benjamin L Lebron
(74) *Attorney, Agent, or Firm* — Pauly, DeVries Smith & Deffner LLC

(57) ABSTRACT

A method for operating a chromatography setup of a bioprocess installation with a plurality of chromatography columns, each with a column inlet and a column outlet, and a valve switching cassette with a group of inlet ports, a group of outlet ports, a group of column-in ports and a group of column-out ports. It is prosed, that a first liquid stream of concentrated buffer is introduced into a first internal liquid line via a first inlet port and that a second liquid stream of diluent is introduced into a second internal liquid line via a second inlet port, that in a dilution process, the array of valve units is switched as to create a third liquid stream by merging the first liquid stream and the second liquid stream at a merging location within the valve switching cassette.

20 Claims, 4 Drawing Sheets

(51) Int. Cl.
*G01N 30/60* (2006.01)
*G01N 30/88* (2006.01)

(56) References Cited

FOREIGN PATENT DOCUMENTS

| WO | 2015117884 | 8/2015 | | |
|---|---|---|---|---|
| WO | WO-2022191971 A1 | * | 9/2022 | ......... B01D 15/1885 |

* cited by examiner

METHOD FOR OPERATING A CHROMATOGRAPHY SETUP

FIELD OF THE TECHNOLOGY

Various embodiments relate to a method for operating a chromatography setup of a bioprocess installation, a chromatography setup for performing the method, an electronic process control of the chromatography setup, a computer program product for the electronic process control and a computer-readable storage media, on which the computer program product is stored.

BACKGROUND

A known method for operating a chromatography process (WO 2015 117 884 A1), in particular, a multi-column SMB chromatography process, comprises a first and at least a second chromatography column, a plurality of buffer vessels and an additional inline merging system having an inlet and an outlet. However, the additional inline merging system requires additional manufacturing floor space and leads to increased material costs as well as a higher structural complexity, as well as higher maintenance costs.

Another known method (EP 1 775 001 A1), relies on a valve switching cassette for operating a chromatography process, in particular, a multi-column SMB chromatography process, with ports and liquid lines, which are organized in a compact manifold. With these ports, it is possible to introduce a plurality of liquid streams into the valve switching cassette, wherein these liquid streams are subsequently directed through the valve switching cassette via said liquid lines. The valve switching cassette comprises an array of switchable valve units for selectively interconnecting internal liquid lines of a first set with internal liquid lines of a second set via transfer lines. To create those internal liquid lines of the first and second set, which are arranged in rows and columns, numerous conduits are being machined into the manifold. With the known valve switching cassette, the internal liquid lines of the first and second sets may be selectively interconnected in a very flexible way. However, the known valve switching cassette is of only limited efficiency with regard to manufacturing costs as well as manufacturing floor space usage.

SUMMARY

The expression "bioprocess" presently represents any kind of biotechnological process, in particular biopharmaceutical processes. The operation of a chromatography arrangement with multiple chromatography columns, which are connected to a valve switching cassette for performing a, optionally multi-column simulated moving bed (SMB), chromatography process, may be part of such a bioprocess.

The method in question may be applied in various fields of biotechnology. High-cost efficiency and increasing flexibility in this field have been driven by the increasing demand for biopharmaceutical drugs. Cost efficiency is not only related to material costs, but also to manufacturing costs, which i.e. depend on the required manufacturing floor space. Flexibility is to be understood in a broad sense, referring to the operational scale of the bioprocessing installation, as well as the mode of the operation itself, such as a flexibility regarding the types and volumes of used buffers. In commercial manufacturing, the floor space is, in general, limited and expensive. However, chromatography processes require large buffer volumes, which is, in particular, true for an SMB chromatography process, since it involves the control of a large number of chromatography columns and process cycles. Therefore, it is particularly important to limit the size and number of manufacturing vessels, such as buffer vessels or buffer preparatory systems, for a bioprocess, in particular for an SMB chromatography process, on the manufacturing floor.

In downstream processes, it is the capturing step that is limiting facility throughput, since the affinity resin is often not used to its full binding capacity to avoid a breakthrough of costly bioproduct. Additionally, the affinity resin is a costly product itself. Hence, there is a strong need to optimize the utilization of the capturing resin, which is why SMB chromatography has become an object of growing interest. This interest is based on the fact that SMB chromatography provides lower production costs by requiring less chromatography column volume, less chromatographic separation media (resin as "stationary phase"), using less energy and requiring far fewer manual working steps, hence unburdening the user. Alternatively, SMB chromatography provides higher throughput at a given amount of resin in comparison to other chromatography methods.

At an industrial scale, an SMB chromatography process is operated continuously, requiring less resin and less buffer per chromatography column in comparison to batch chromatography, although the overall required buffer volume may be increased due to its continuous operation. Conclusively, on an industrial scale, SMB chromatography is used in order to improve the economics of the bioprocess. The method in question relies on using low volumes of concentrated buffers, which are merged, and hence diluted, on-skid without the need for a separate inline merging system.

The terms "merging" and "diluted" mean here a process of decreasing (diluting) the concentration of a solute in a solution, such as of a concentrated buffer, usually by mixing (merging) the solution with a solvent, such as water.

It is therefore an object of the present disclosure to provide a method for operating a chromatography process, which increases the cost efficiency by reducing the required manufacturing floor space with as little effort as possible.

The above noted problem is solved by a method for operating a chromatography process according to the disclosure.

The general concept underlying the disclosure is based on the finding that the required manufacturing floor space, as well as the required buffer volume, can be reduced by mixing a low volume, concentrated buffer and a diluent within the valve switching cassette (inline). Thereby, a diluted working buffer is created, which can be immediately used for the current chromatography process, in particular SMB chromatography process, without the need for a plurality of large volume buffer vessels. Therefore, it is proposed to double-use a valve switching cassette: On the one hand, for selectively interconnecting components of a bioprocess and, on the other hand, for an inline merging on-skid, without the need for a separate inline merging system, to reduce the required manufacturing floor space of a bioprocess, in particular of a multi-column SMB chromatography process.

In detail, it is proposed, that a first liquid stream of concentrated buffer is introduced into a first internal liquid line via a first inlet port and that a second liquid stream of diluent is introduced into a second internal liquid line via a second inlet port, that in a dilution process, the array of valve units is switched as to create a third liquid stream by merging the first liquid stream and the second liquid stream at a merging location within the valve switching cassette.

As noted above, the third liquid stream is located at least partly within the valve switching cassette, and in some embodiments, also partly externally of the valve switching cassette.

The term "buffer" means any aqueous or non-aqueous solution used for chromatography steps in chromatography processes, in particular equilibration-, loading-, washing-, elution-, regeneration- and/or storage-buffer. These buffers may be of the same or different composition.

The term "diluent" means any aqueous or non-aqueous solvent used as a basis for chromatography buffer production, such as water, in particular demineralized, sterile-filtered and/or de-ionized water.

Various embodiments are directed to the selective and individual control of the switchable valve units as well as of the pumps of the liquid pumping arrangement by the electronic process control. These measures are particularly advantageous since they solve the above noted problem of creating a desired target dilution factor in the third liquid stream. This is of particular interest when using at least one chromatography column since it ensures that only properly diluted buffer comprising desired, predefined properties are applied onto the chromatography column.

Various embodiments refer to the presence of a first and a second set of internal liquid lines arranged in two planes of the valve switching cassette. The valve units are arranged to selectively interconnect an internal liquid line of the first set with an internal liquid line of the second set. This is achieved by a fluidic communication, in particular, a communication via transfer lines. This selective interconnection by the valve units offers a notable flexibility regarding the choice of the respective potential flow paths.

Various embodiments regarding the flow paths of the liquid streams are specified. The first and the second liquid stream each proceed in a separate internal liquid line before both liquid streams are introduced into one and the same internal liquid line by corresponding valve units, which is thereby providing the merging location. This is particularly advantageous since it provides the merging location inside the valve switching cassette without the need for a separate, external merging device.

Various embodiments refer to the presence of an internal stream through one or more of internal liquid lines and of an external stream through one or more of external liquid lines outside the valve switching cassette. This is of particular interest since it creates an inline merging without the need for a separate inline merging device.

Various embodiments are directed to the required length of the third liquid stream, derived from a dilution model. The dilution model is of particular interest since it serves as a rule system to derive the minimum merging lengths and/or minimum merging times necessary to determine the lengths and/or diameters of the respective external liquid lines. For this, the dilution model takes i.a. chromatography setup parameters and rheological parameters into account. Complying with these measures ensures the stable creation of the target dilution factor at the end of the third liquid stream and guarantees that only properly diluted buffer will be directed over the at least one chromatography column.

Various embodiments refer to a human-machine interface to either input the target dilution factor and/or output the minimum merging length. This offers an additional level of control and information for the user since the user can freely input the target dilution factor and/or receives advice regarding the required minimum merging length necessary to estimate the required length for the one or more external liquid lines for creating the target dilution factor.

Various embodiments specify that the chromatography process can be a multi-column chromatography (MCC) process. Thereby, an inline merging without the need for a separate inline merging device is created for multi-column SMB chromatography, which employs a complex system of a plurality of chromatography columns and respective valves.

Various embodiments refer to a sensor arrangement for providing sensor values. This offers the advantage that the actual dilution factor of the third liquid stream can be verified at a measuring position by comparing the measured, actual dilution factor to the target dilution factor. This is particularly advantageous since the actual dilution factor is represented by these sensor values and can be adjusted in case of an emergency event, such as a pump failure. Moreover, this offers the advantage that the user can determine the required minimum merging lengths or minimum merging times necessary to estimate the required length for the at least one external liquid line, prior to a bioprocess.

Various embodiments regarding bypassing the at least one chromatography column are specified. After the sensor arrangement detects a stable value for the dilution factor, the electronic process control switches from bypassing the at least one chromatography column to the external liquid line leading to the chromatography column. This offers the major advantage that not yet correctly diluted buffer bypasses the at least one chromatography column, hence increasing the separation performance and product recovery as well as lifetime of all involved chromatography columns.

According to various embodiments, the chromatography setup for performing the proposed method is provided. All explanations given with regard to the first teaching are fully applicable to this second teaching.

Various embodiments are directed to an electronic process control. The electronic process control is designed to perform the proposed method. According to various embodiments, the electronic process control comprises a data processing system for carrying out the proposed method. All explanations given with regard to the first and second teaching are fully applicable to this third teaching.

According to various embodiments, a computer program product for the proposed electronic process control is provided. The computer program product is configured to carry out the proposed method. All explanations given with regard to the first, second and third teachings are fully applicable to this fourth teaching.

According to various embodiments, a computer-readable storage media, on which the computer program is stored, is provided. All explanations given with regard to the first to fourth teaching are fully applicable to this fifth teaching.

Various embodiments provide a method for operating a chromatography setup of a bioprocess installation for performing a chromatography process, wherein the chromatography setup comprises a plurality of chromatography columns, each with a column inlet and a column outlet, and a valve switching cassette, wherein the valve switching cassette comprises a group of inlet ports, a group of outlet ports, a group of column-in ports and a group of column-out ports, wherein each port is communicating with an assigned internal liquid line within the valve switching cassette, wherein the valve switching cassette comprises an array of switchable valve units, which are selectively interconnecting the internal liquid lines for carrying out the chromatography process, wherein the chromatography setup comprises a liquid pumping arrangement assigned to the valve switching cassette and an electronic process control for controlling at least the switchable valve units and the liquid pumping arrangement, wherein a first liquid stream of concentrated buffer is introduced into a first internal liquid line via a first inlet port and that a second liquid stream of diluent is introduced into a second internal liquid line via a second inlet port, that in a dilution process, the array of valve units is switched as to create a third liquid stream by merging the first liquid stream and the second liquid stream at a merging location within the valve switching cassette.

In various embodiments, the switchable valve units and the liquid pumping arrangement are being controlled by the electronic process control as to create a predefined target dilution factor in the third liquid stream, such as, at least at the end of the third liquid stream.

In various embodiments, the liquid pumping arrangement comprises a first pump driving the first liquid stream and a second pump driving the second liquid stream and that both pumps are selectively controlled by the electronic process control as to create the target dilution factor in the third liquid stream.

In various embodiments, a first set of the internal liquid lines and a second set of the internal liquid lines are arranged in two, in some embodiments parallel, planes of the valve switching cassette, wherein the valve units of the valve switching cassette are arranged as to selectively interconnect an internal liquid line of the first set and an internal liquid line of the second set.

In various embodiments, the valve units are each communicating with an internal liquid line of the first set and with an internal liquid line of the second set, such as via transfer lines, as to selectively interconnect those internal liquid lines.

In various embodiments, the first liquid stream and the second liquid stream each proceed in a separate internal liquid line of the first set, that the first liquid stream and the second liquid stream are introduced into one and the same internal liquid line of the second set by switching corresponding valve units, such that this internal liquid line of the second set provides the merging location and that the merging location defines the starting point of the third liquid stream.

In various embodiments, the third liquid stream comprises an internal stream through one or more of internal liquid lines within the valve switching cassette, and, in some embodiments, an external stream through one or more of external liquid lines outside the valve switching cassette, and that during a running process of at least one of the chromatography columns, the end of the third liquid stream is defined at the column inlet of the respective chromatography column.

In various embodiments, the stream length of the third liquid stream is larger than a minimum merging length and that the minimum merging length is being derived from a dilution model, such as by the electronic process control, and/or, that the stream length of the third liquid stream is larger than the length that corresponds to a minimum merging time and the flow rates of the pumps of the liquid pumping arrangement.

In various embodiments, complying with the minimum merging length and/or the minimum merging time ensures the stable creation of the target dilution factor at the end of the third liquid stream.

In various embodiments, the dilution model represents the interdependence between the minimum merging length on the one hand and the flow rates of the pumps and/or the ratio of the flow rates of the pumps and the target dilution factor on the other hand, and/or, that the dilution model represents the interdependence between the minimum merging time on the one hand and the flow rates of the pumps and/or the ratio of the flow rates of the pumps and the target dilution factor on the other hand.

In various embodiments, the electronic process control comprises a human-machine interface to input the target dilution factor and/or to output the minimum merging length, in particular the length of the respective external liquid line for the third liquid stream.

In various embodiments, the chromatography process is a multi-column chromatography process, in particular a simulated moving bed chromatography process, in some embodiments, that during the chromatography process, liquid such as feed liquid or buffer liquid, is being introduced into one of the inlet ports.

In various embodiments, the chromatography setup comprises a sensor arrangement with at least one sensor providing sensor values, which are being transmitted to the electronic process control, which sensor values represent the actual dilution factor of the third liquid stream at a measuring position, in some embodiments, that the sensor provides the conductivity of the third liquid stream as sensor values.

In various embodiments, the chromatography setup comprises a bypass line, set up to provide an internal liquid line for a liquid stream to circumvent at least one chromatography column and that in a prime process, the third liquid stream is guided through the bypass line.

In various embodiments, during a running process of one of the chromatography columns, the third liquid stream is guided through the bypass line, and subsequently guided through a column line leading to the respective chromatography column.

In various embodiments, the electronic process control switches from the bypass line to the column line, after the sensor arrangement detected a stable value for the actual dilution factor at the end of the bypass line.

Various embodiments provide a chromatography setup for performing the method according to the disclosure.

Various embodiments provide an electronic process control of the chromatography setup according to the disclosure.

In various embodiments, the electronic process control comprises a data processing system for carrying out the method.

Various embodiments provide a computer program product for the electronic process control according to the disclosure.

Various embodiments provide a computer-readable storage media, on which the computer program product according to the disclosure is stored, such as in a non-volatile manner.

BRIEF DESCRIPTION OF THE DRAWINGS

In the following, an embodiment of the disclosure is explained with respect to the drawings. The drawings show in FIG. 1 a proposed chromatography setup with a valve switching cassette, with which a proposed method is executable, FIG. 2 the pump ratio and/or flow rate control according to FIG. 1, FIG. 3 the valve switching cassette according to FIG. 1 in a first exemplary mode of operation using the bypass line, FIG. 4 the valve switching cassette according to FIG. 1 in a second exemplary mode of operation using the column line.

DETAILED DESCRIPTION

Figure 1:
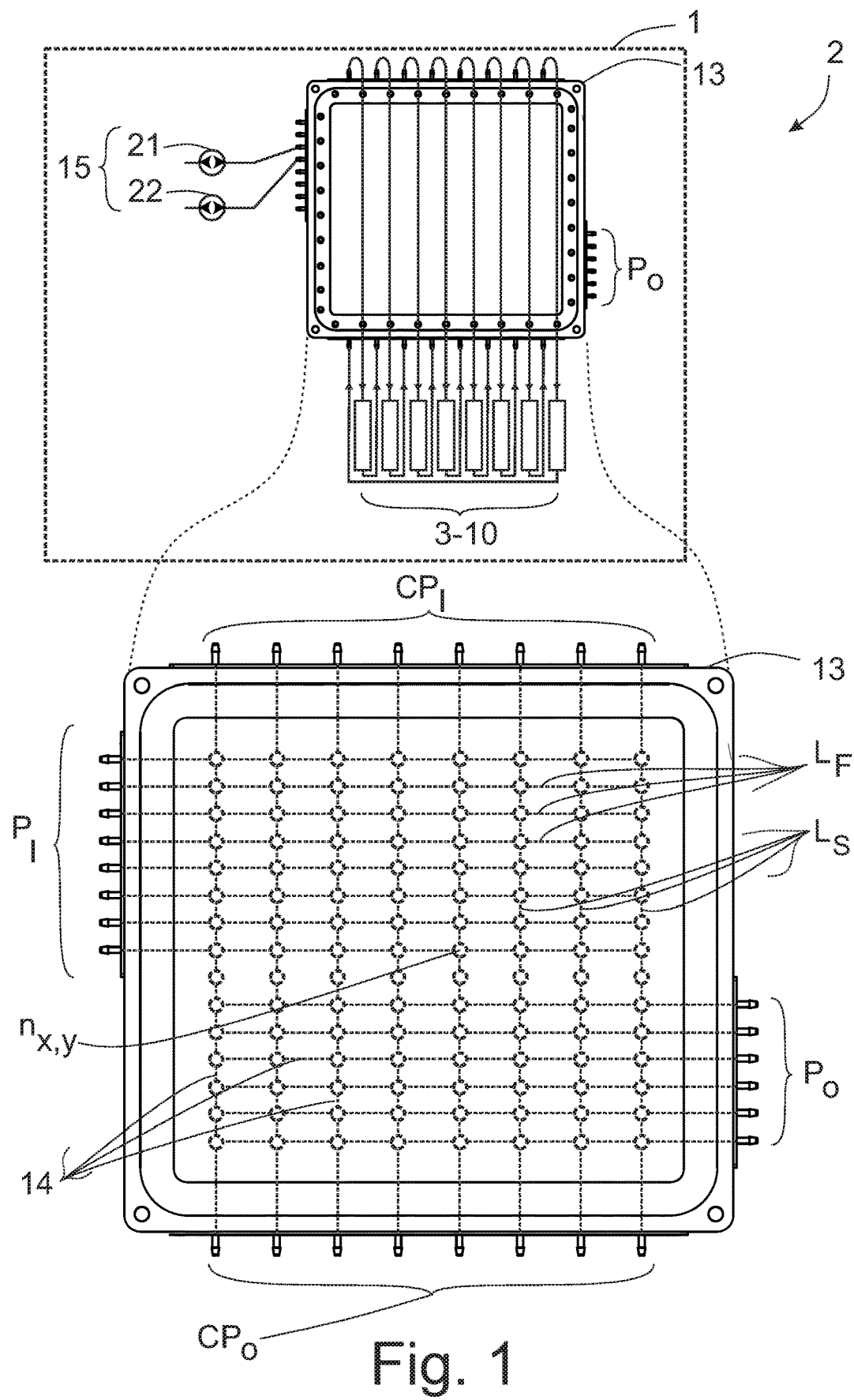

The proposed method for operating a chromatography setup 1 of a bioprocess installation 2 for performing a chromatography process can be assigned to downstream processing.

The expression "chromatography process" presently represents any kind of biochemical purification process, in particular biopharmaceutical purification processes, employing at least one chromatography column 3 to 10 for the separation of chemical compounds. The operation of a chromatography setup 1 with multiple chromatography columns 3 to 10 for performing a multi-column SMB process represents such a chromatography process.

The term "downstream processing" involves all the steps related to the recovery and the purification of biosynthetic products, particularly biopharmaceuticals, from natural sources such as animal or plant tissue or cell broth, including the recycling of salvageable components and the proper treatment and disposal of waste. Such steps can be liquid/solid separations, capturing, purification and/or polishing steps.

In general, the cultivation of cells is currently used for the production of biopharmaceuticals, in particular proteins, such as human insulin, growth factors, hormones, vaccines, or antibodies, antibody derivatives, or viral vectors such as lentiviral vectors and adeno-associated viral vectors and the like. The products may as well be non-biopharmaceuticals, such as enzymes for food processing, laundry detergent enzymes, biodegradable plastics or biofuels. The focus of the present disclosure is on biopharmaceutical products, such as antibodies, viral vectors, nucleic acids such as DNA and RNA or the like.

As shown in FIGS. 1 to 4, the proposed method for operating a chromatography setup 1 of a bioprocess installation 2 for performing a chromatography process employs a plurality of chromatography columns 3 to 10. In some embodiments, the proposed method employs at least four, at least six, or here eight, chromatography columns, each with a column inlet 11 and a column outlet 12. Moreover, the chromatography setup comprises a valve switching cassette 13. It is especially noteworthy, that the proposed method is easily adaptable for employing even more than eight chromatography columns 3 to 10 simultaneously, due to the complex valve manifold provided by the valve switching cassette 13. According to some embodiments (not shown), the valve switching cassette 13 can employ up to 16 chromatography columns 3 to 10 simultaneously.

The chromatography setup 1 with a plurality of chromatography columns 3 to 10 is being operated in a chromatography cycle comprising chromatography steps, such as equilibration-, loading-, washing-, elution-, regeneration- and storage steps.

The equilibration step describes the step by which a system enters its state of equilibrium. In a chromatography setup 1, this refers to a filling of the respective chromatography column 3 to 10 with the respective buffer to be used for the subsequent bioproduct purification, until its entire volume is occupied by the respective buffer.

The loading step refers to a step of loading the respective chromatography column 3 to 10 with product-containing supernatant in order to bind the product to the at least one chromatography column 3 to 10 initiating the purification of the bioproduct.

The washing step refers to a step of washing the respective chromatography column 3 to 10 with buffer. This washing step typically serves for flushing the respective chromatography column 3 to 10 to remove unspecifically bound compounds and separate them from the target product.

The elution step describes the step of extracting one material from another, e.g. by eluting with a solvent, such as water, buffer, imidazole or the like. Here, it refers to the extraction of the bioproduct from the respective chromatography column 3 to 10 using an aqueous solution, such as with pH- and/or ion gradients, representing different salt concentrations and conductivities.

The regeneration step describes the step of recovering the separation material in order to recover the separation performance of the at least one chromatography column 3 to 10. In this particular context, it refers to a re-equilibration and/or cleaning of the respective chromatography column 3 to 10, e.g. with sodium hydroxide (NaOH) solution.

The storage step describes the step of flushing the at least one chromatography column 3 to 10 with e.g. an ethanol solution keeping the separation material sterile. In this particular context, it refers to storage of the respective separation material of the chromatography column 3 to 10, such as in a 10% ethanol (EtOH) solution.

According to FIG. 1, the valve switching cassette 13 comprises a group of inlet ports $P_I$, a group of outlet ports $P_O$, a group of column-in ports $CP_I$ and a group of column-out ports $CP_O$, wherein each port $CP_I$, $CP_O$ is communicating with an assigned internal liquid line 14 within the valve switching cassette 13.

The term "internal liquid line" means here the entirety of all internal liquid lines 14 within the valve switching cassette 13.

The expression "port" represents the interface for interconnecting components of the bioprocess installation 2 to the respective internal liquid line 14.

The expression "line" represents any longitudinal volume that may hold and guide liquid between two locations. A line in this sense may also include an inflatable and collapsible conduit structure.

The term "column-in port" represents the interface of the valve switching cassette 13 for interconnecting components of the bioprocess installation 2, to create an outflow of liquids out of the valve switching cassette 13 into at least one chromatography column 3 to 10.

The term "column-out port" represents the interface of the valve switching cassette 13 for interconnecting components of the bioprocess installation 2, to create an outflow of liquids out of the chromatography column 3 to 10 into the valve switching cassette 13.

As shown in FIG. 1, the component to be selectively interconnected is an above noted chromatography setup 1 with multiple chromatography columns 3 to 10 for performing multi-column SMB chromatography. Here, the group of inlet ports $P_I$ is used as inlets for feed or buffer or the like. These are selectively guided to the respective column-in ports $CP_I$, the respective column inlets 11, passing through the respective chromatography columns 3 to 10 and leaving the chromatography columns 3 to 10 via column outlets 12 and re-entering the valve switching cassette 13 via column-out ports $CP_O$.

As shown in FIG. 1, the valve switching cassette 13 comprises an array of switchable valve units $n_{x,y}$, which are selectively interconnecting the internal liquid lines 14 for performing the chromatography process, in particular the multi-column SMB process.

The expression "switchable" refers to the possibility of changing the valve unit $n_{x,y}$ from the state "valve open" to the state "valve close" or from the state "valve close" to the state "valve open". The open valve units $n_{x,y}$ are indicated as solid circles, while the closed valve units $n_{x,y}$ are indicated as outlined circles in FIG. 3 and FIG. 4.

The expression "interconnecting" is to be understood in the sense of a fluidic connection.

Moreover, the chromatography setup 1 comprises a liquid pumping arrangement 15 assigned to the valve switching cassette 13 and an electronic process control 16 for controlling at least the switchable valve units $n_{x,y}$ and the liquid pumping arrangement 15.

It can be particularly essential for some embodiments, that a first liquid stream 17 of concentrated buffer is introduced into a first internal liquid line 14 via a first inlet port $P_I$ and that a second liquid stream 18 of diluent is introduced into a second internal liquid line 14 via a second inlet port $P_I$. In a dilution process, the array of valve units $n_{x,y}$ is switched as to create a third liquid stream 19 by merging the first liquid stream 17 and the second liquid stream 18 at a merging location 20 within the valve switching cassette 13.

Figure 2:
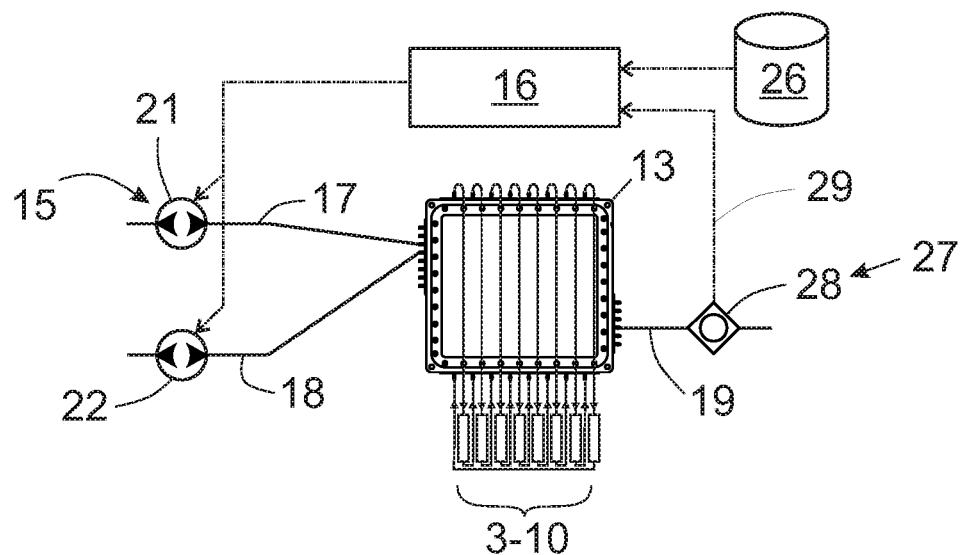

As shown in FIG. 1 and FIG. 2, here, the switchable valve units $n_{x,y}$ and the liquid pumping arrangement 15 are being controlled by the electronic process control 16. Thereby, a predefined target dilution factor in the third liquid stream 19 is created, in some embodiments, at least at the end of the third liquid stream 19.

Here, as can be seen in FIG. 1 and FIG. 2, the liquid pumping arrangement 15 comprises a first pump 21 driving the first liquid stream 17 and a second pump 22 driving the second liquid stream 18. Both pumps 21, 22 are selectively controlled by the electronic process control 16 as to create the target dilution factor in the third liquid stream 19. In general, a dilution factor, in particular, the target dilution factor, is a consequence of the pumping speeds of the different pumps, driving the liquids to be merged. The individual flow speeds of the first liquid stream 17 and the second liquid stream 18 including their ratios, therefore, define the merging ratio in the third liquid stream 19.

The third liquid stream 19 comprises predefined properties, such as at the endpoint of the third liquid stream 19. These predefined properties may be a desired final salt concentration (and hence conductivity), a desired final pH, temperature, flow rate or the like. The endpoint of the third liquid stream 19 is either defined by the respective column inlet 11 (during a running process) or by the position of the sensor arrangement 27 (verification process noted below).

Figure 3:
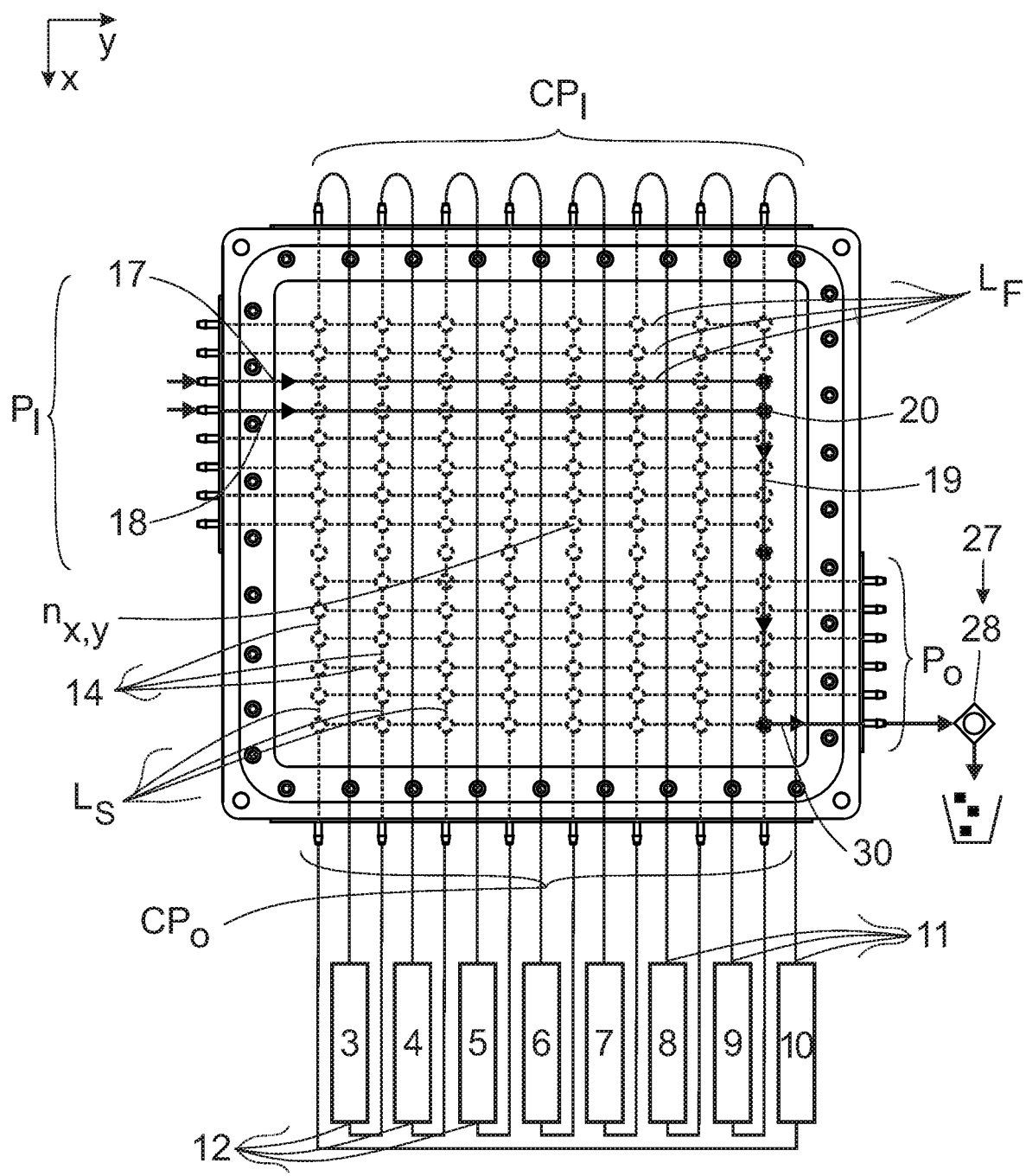
Figure 4:
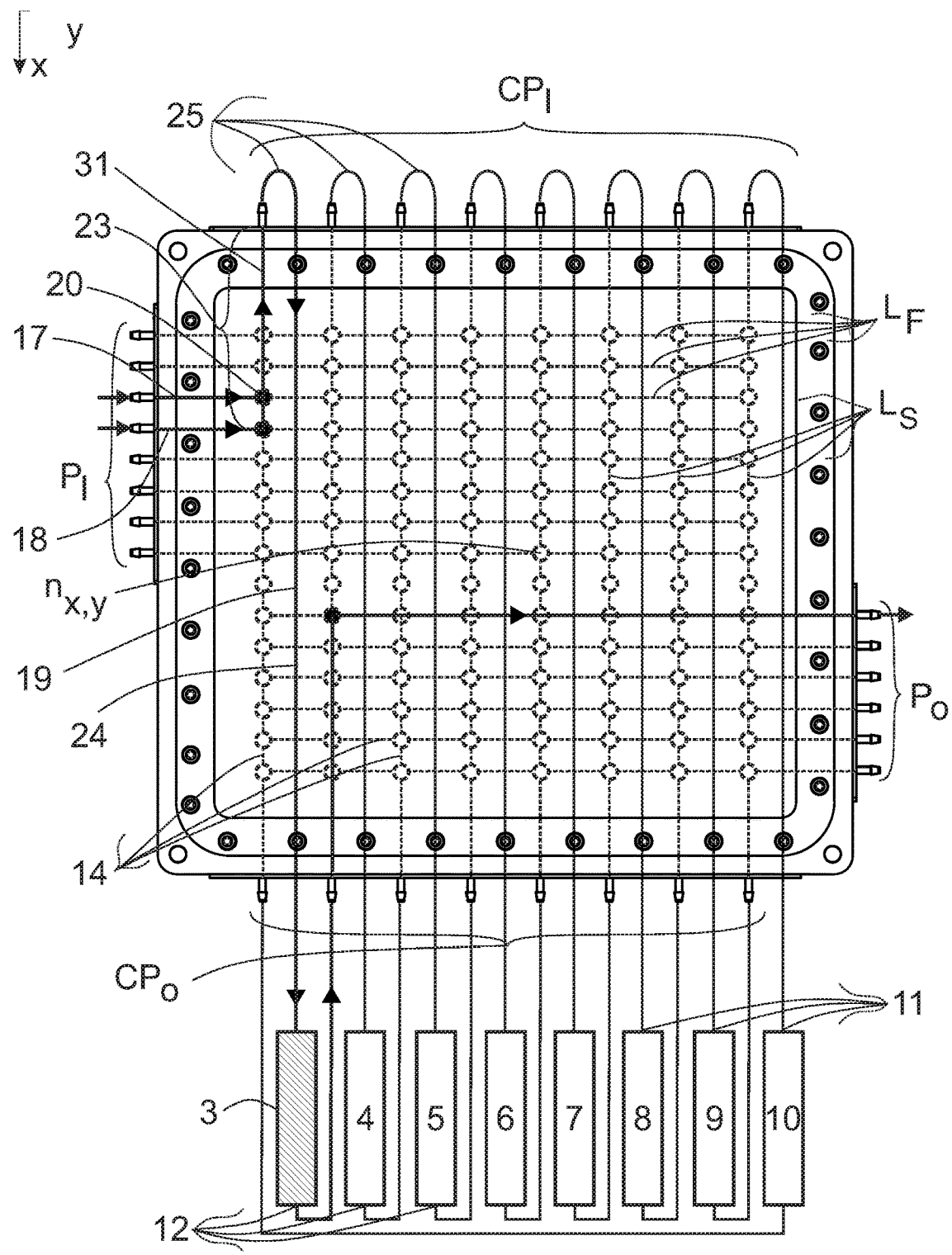

Here, according to FIG. 1, FIG. 3 and FIG. 4, a first set of the internal liquid lines $L_F$ and a second set of the internal liquid lines $L_S$ are arranged in two, in some embodiments parallel, planes of the valve switching cassette 13. The valve units $n_{x,y}$ of the valve switching cassette 13 are arranged as to selectively interconnect an internal liquid line of the first set $L_F$ and an internal liquid line of the second set $L_S$.

The expression "selectively interconnecting" means, that one or more of the internal liquid lines of the first set $L_F$ may be selected to be interconnected with one or more of the internal liquid lines of the second set $L_S$.

In some embodiments, the valve units $n_{x,y}$ are each communicating with an internal liquid line of the first set $L_F$ and with an internal liquid line of the second set $L_S$, such as via transfer lines, as to selectively interconnect those internal liquid lines $L_F$, $L_S$. These transfer lines can be arranged orthogonally with regard to the two, in some embodiments parallel, planes of the first set of internal liquid lines $L_F$ and the second set of internal liquid lines $L_S$.

The first liquid stream 17 and the second liquid stream 18 each proceed in a separate internal liquid line of the first set $L_F$. Subsequently, the first liquid stream 17 and the second liquid stream 18 are introduced into one and the same internal liquid line of the second set $L_S$. The two liquid streams 17, 18 can be sequentially or simultaneously introduced into the same internal liquid line of the second set $L_S$. This is implemented by switching corresponding valve units $n_{x,y}$, such that this internal liquid line of the second set $L_S$ provides the merging location 20. The merging location 20 defines the starting point of the third liquid stream 19.

Hence, and according to FIG. 3 and FIG. 4, the merging location 20 is inside the valve switching cassette 13 and can be implemented in any internal liquid line of the second set $L_S$. In some embodiments, the merging location 20 is implemented in the first internal liquid line of the second set $L_S$, which the first and second liquid streams 17, 18 cross in their separate corresponding internal liquid lines of the first $L_F$ set, when entering the valve switching cassette 13. The first liquid stream 17 and the second liquid stream 18 can be entering the valve switching cassette 13 via the inlet ports $P_I$ and are directed to the outlet ports $P_O$, or, the first liquid stream 17 and the second liquid stream 18 can be entering the valve switching cassette 13 via the outlet ports $P_O$ and are directed to the inlet ports $P_I$. This means that the valve switching cassette 13 is fluidically controllable in both possible fluidic flow directions.

Here, as can be seen in FIG. 4, the third liquid stream 19 comprises an internal stream 23 through one or more of internal liquid lines 14 within the valve switching cassette 13, and, in some embodiments, an external stream 24 through one or more of external liquid lines 25 outside the valve switching cassette 13. To clarify and as may be derived from FIG. 3, the third liquid stream 19 may comprise only an internal stream 23 through the bypass line 30 of the second set $L_S$ in order to determine the required minimum merging lengths or minimum merging times necessary to determine the lengths and/or diameters for at least one external liquid line, prior to a bioprocess.

In general, external liquid lines 25 are necessary in order to connect respective column-in ports $CP_I$ to the respective column inlets 11. Here, the external liquid lines 25 are double used: The external stream 24 flows through one or more of external liquid lines 25 outside the valve switching cassette 13 and serves additionally for creating a defined minimum merging length and/or merging time, necessary to establish the desired target dilution factor in the third liquid stream 19, which will be explained below.

According to FIG. 4, the at least one external liquid line 25 can be provided by a single-use tubing that is interposed in between a column-in port $CP_I$ of the valve switching cassette 13 and the column inlet 11 of at least one chromatography column 3 to 10. During a running process of at least one of the chromatography columns 3 to 10, the end of the third liquid stream 19 is defined at the column inlet 11 of the respective chromatography column 3 to 10. Conclusively, the stream length of the third liquid stream 19 is defined by its starting point at the merging location 20 and by its endpoint at the column inlet 11 of the respective chromatography column 3 to 10.

The term "running process" defines potentially any chromatography step in chromatography processes, wherein a liquid stream is directed via at least one chromatography column 3 to 10, such as equilibration-, loading-, washing-, elution-, regeneration- and/or, storage steps.

Here, as can be seen in FIG. 3 and FIG. 4, the stream length of the third liquid stream 19 is larger than a minimum merging length.

The terms "minimum merging length" and "minimum merging time" mean here the minimal distance and minimal time respectively that the third liquid stream 19 requires for a stable creation of the target dilution factor.

In some embodiments, this minimum merging length is being derived from a dilution model 26, such as by the electronic process control 16 or by a user. Additionally or alternatively, the stream length of the third liquid stream 19 is larger than the length that corresponds to a minimum merging time and the flow rates of the pumps of the liquid pumping arrangement 15.

In some embodiments, according to FIG. 4, complying with the minimum merging length and/or the minimum merging time ensures the stable creation of the target dilution factor at the end of the third liquid stream 19.

The term "stable" means here, that the actual dilution factor is not deviating from the target dilution factor by more than a predefined value, such as deviating less than 10%, less than 5%, or less than 3% from the target dilution factor.

In some embodiments, the dilution model 26 represents the interdependence between the minimum merging length on the one hand and the flow rates of the pumps and/or the ratio of the flow rates of the pumps and the target dilution factor on the other hand. Additionally or alternatively, the dilution model 26 represents the interdependence between the minimum merging time on the one hand and the flow rates of the pumps and/or the ratio of the flow rates of the pumps and the target dilution factor on the other hand.

The dilution model 26 is to be understood as a rule system to derive the minimum merging length and/or minimum merging time necessary to determine the lengths and/or diameters of the respective external liquid lines 25. These lengths and/or diameters of the respective external liquid lines 25 enable a stable creation of the target dilution factor in the external stream 24. The minimum merging length and/or minimum merging time are i.a. dependent on the flow rates of the first liquid stream 17 and second liquid stream 18 (additionally or alternatively dependent on the resulting flow rate of the third liquid stream 19) as well as from the ratios of the flow rates of the first liquid stream 17 and second liquid stream 18. These flow rates and ratios of the flow rates are in turn dependent on the flow rates of the corresponding pumps 21, 22 as well as from the ratios of the flow rates of the corresponding pumps 21, 22, respectively.

The dilution model 26 can rely on statistical modelling or machine learning algorithms in order to determine the minimum merging length and/or minimum merging time. The machine-learning mechanism can be based on a supervised or non-supervised neural network, which is, further, a neural convolution network (CNN).

Additionally or alternatively, the minimum merging length and/or minimum merging time can be derived by a series of experiments, such as executed by the user. In the course of such a series of experiments, the individual minimum merging lengths and/or minimum merging times can be empirically determined by testing the interplay between the individual target dilution factors on the one hand, and the individual flow rates of the pumps and/or the ratio of the flow rates of the pumps, as well as viscosities, pressures, densities and temperatures of the liquids to be merged, as a function of space and time, on the other hand. In some embodiments, all the derived minimum merging lengths and/or minimum merging times are stored, such as in a lookup table and/or a cloud service instance.

Thereby, the required minimum merging lengths and/or minimum merging times can be easily looked up, such as by the electronic process control 16 and/or the user. For this reason, the chromatography setup 1 can be designed without a sensor 28 providing sensor values 29 of the third liquid stream 19, since an additional verification of the individual minimum merging lengths and/or minimum merging times by the user becomes unnecessary.

Hence, in the dilution model 26, the electronic process control 16 can determine the distance and/or the time necessary for the third liquid stream 19 to cover the distance between its start and its end, such as, to cover the distance between the merging location 20 and the column inlet 11 of the at least one chromatography column 3 to 10.

In some embodiments, and just as an example, by a synopsis of the required time and the respective flow rates, the electronic process control 16 calculates the required volume of the external liquid line 25, which is necessary to provide the minimum merging time required for a stable creation of the target dilution factor in the external stream 24.

Alternatively, by a synopsis of the required distance, the respective flow rates and the diameter of the internal liquid lines of the second set $L_S$, the electronic process control 16 can calculate the required length and the required diameter of the external liquid line 25, which is necessary to provide the minimum merging length necessary for a stable creation of the target dilution factor in the external stream 24.

In some embodiments, the dilution model 26 may be exchanged between two different operating instances or even within one and the same operating instance. Moreover, the dilution model 26 is highly adaptable to different bioprocess settings leading to altered flow paths, dilution factors, tubing lengths, tubing diameters, flow rates, ratios of the flow rates, flow rates of the pumps and ratios of the flow rates of the pumps. This adaptability renders the proposed method exceptionally flexible.

In some embodiments, the electronic process control 16 comprises a human-machine interface to input the target dilution factor. In some embodiments, the user can pre-set the target dilution factor in the electronic process control 16 to be measured in the third liquid stream 19. According to this pre-set target dilution factor, the electronic process control 16 adjusts the flow rates of the pumps and/or the ratio of the flow rates of the pumps. Accordingly, a stable creation of the target dilution factor at the end of the third liquid stream 19 means that the actual target dilution factor is not deviating from the target dilution factor, by more than a predefined value.

Additionally or alternatively, the electronic process control comprises a human-machine interface to output the minimum merging length, in particular the length of the respective external liquid line 25 for the third liquid stream 19. In some embodiments, the user can subsequently prepare the length of the respective external liquid 25 line accordingly, further such as by installing single-use tubes comprising the proper minimum merging length, or, by cutting single-use tubes under sterile conditions according to the output minimum merging lengths. In case of an emergency event, such as a pump failure, when using the outputted minimum merging length, the stable creation of the target dilution factor can be verified by the user, as will be explained later.

In some embodiments, as can be seen in FIG. 1 to FIG. 4, the chromatography process is a multi-column chromatography (MCC) process, in particular a simulated moving bed chromatography (SMB) process. It can be that during the chromatography process, liquid such as feed liquid or buffer liquid, is being introduced into one of the inlet ports $P_I$.

In some embodiments, as can be seen in FIG. 2 and FIG. 3 the chromatography setup 1 comprises a sensor arrangement 27 with at least one sensor 28 providing sensor values 29. These sensor values 29 are being transmitted to the electronic process control 16. The sensor 28 can provide the conductivity of the third liquid stream 19 as sensor values 29, hence representing the actual dilution factor of the third liquid stream 19 at a measuring position. Additionally, these sensor values 29 can represent other properties of the third liquid stream 19, such as properties such as pH, temperature or optical density.

The sensor arrangement 27 is not only used to adjust the dilution factor in case of an emergency event but also to determine the required minimum merging lengths or minimum merging times prior to the bioprocess, which are necessary for a stable creation of the target dilution factor in the third liquid stream 19. Thereby, the lengths and diameters of the respective required external liquid line 25 can be derived. In some embodiments, the sensor arrangement 27, in particular the measuring position, is located at the end of the bypass line 30, which bypass line 30 is to be discussed later. For determining the required minimum merging lengths or minimum merging times prior to the bioprocess, or, in case of a verification process, the end of the third liquid stream 19 is defined at the at least one sensor 28 of the sensor arrangement 27.

As mentioned above, in case of an emergency event, a stable creation of the target dilution factor at the end of the third liquid stream 19 can be verified by the user. Here, the sensor 28 can be used for verifying the stable creation of the target dilution factor in the third liquid stream 19. For a verification, the actual dilution factor of the third liquid stream 19 represented by the sensor values 29, are compared to the target dilution factor. A verification can be achieved when the actual dilution factor, measured by the at least one sensor 28 in the third liquid stream 19, corresponds to the target dilution factor, such as, when the actual dilution factor is deviating less than 10%, less than 5%, or less than 3% from the target dilution factor.

In the case of such a verification process, the terms "minimum merging length" and "minimum merging time" refer to the distance and time that the third liquid stream 19 covers to flow from the merging location 20 to the at least one sensor 28 providing sensor values 29, such as the conductivity of the third liquid stream 19. Here, as can be seen in FIG. 3, the sensor 28 is located in close proximity of the outlet port $P_O$. In some embodiments, the distance between the outlet port $P_O$ and the sensor 28 is taken into account by the dilution model, when verifying the minimum merging length and minimum merging time in a verification process, or, in a pre-calibration step, to determine the minimum merging lengths or minimum merging times of the third liquid stream 19 in the first place, prior to the bioprocess.

In case of an emergency event, the actual dilution factor, measured by the at least one sensor 28 in the third liquid stream 19, does not correspond to the target dilution factor. In this case, the electronic process control 16 can adjust the flow rates of the pumps and/or the ratio of the flow rates of the pumps until the measured sensor values 29 are corresponding to the target dilution factor, further, until the measured sensor values 29 are deviating less than 10%, further less than 5%, further less than 3% from the target dilution factor.

In some embodiments, the chromatography setup comprises a bypass line 30, set up to provide an internal liquid line 14 for a liquid stream to circumvent at least one chromatography column 3 to 10. In a prime process, the third liquid stream 19 is guided through the bypass line 30. Thereby, during the chromatography process, a third liquid stream 19 not comprising the target dilution factor bypasses the at least one chromatography column 3 to 10 via one of the internal liquid lines 14 by switching corresponding valve units ($n_{x,y}$).

The term "bypass line" means here potentially any internal liquid line 14 that serves for bypassing at least one chromatography column 3 to 10.

The term "prime process" means here a process by which the internal liquid lines 14 are filled with liquid, enabling a pump to promote the liquid inside the valve switching cassette 13.

In the following, two exemplary modes of operation applying the proposed method are described with reference to FIGS. 3 and 4.

In a first mode of operation, as can be seen in FIG. 3, and just as an example, the first liquid stream 17, such as a liquid stream of concentrated buffer, and the second liquid stream 18, such as a liquid stream of sterile water, are introduced into the valve switching cassette 13 via corresponding inlet ports $P_I$, here the corresponding inlet ports $P_I$ at position three and four. Here, both liquid streams 17, 18 are merged in the eighth internal liquid line of the second set $L_S$, which both liquid streams 17, 18 cross within the valve switching cassette 13. Here, the resulting third liquid stream 19 enters the bypass line 30 in order to bypass the at least one chromatography column 3 to 10, and is subsequently discarded into waste.

Such mode of operation can, for example, be used in case of an emergency event, such as a pump failure, to verify a stable creation of the target dilution factor with the help of the sensor arrangement 27 after the emergency event has been resolved. Alternatively, as mentioned above, this can be used to determine the minimum merging times necessary to create the target dilution factor in the third liquid stream 19 and/or to determine the minimum merging lengths of the external liquid lines 25, prior to such a bioprocess.

As soon as the sensor arrangement 27 detects a stable value for the actual dilution factor at the end of the bypass line 30 after such an emergency has been resolved, the electronic process control 16 switches from the bypass line 30 to the column line 31. A stable value is detected, here, by the electronic process control 16.

Upon the switching of the corresponding valve units $n_{x,y}$, in a second mode of operation, as can be seen in FIG. 4, the third liquid stream 19 enters the column line 31, leading to the at least one chromatography column 3 to 10.

The term "column line" means here potentially any internal liquid line 14 or external liquid line 25 that can lead the third liquid stream 19 to the respective chromatography column 3 to 10.

According to a second teaching, the chromatography setup 1 for performing the proposed method is provided as such. In various embodiments, the components of the chromatography setup 1 that are at least necessary for the intended function, in particular at least including the valve switching cassette 13 and the liquid pumping arrangement 15, form a structural entity. Here, the structural entity is designed as a preassembled unit. Reference is made to all explanations given before.

According to various embodiments, an electronic process control 16 of the chromatography setup 1 for performing the proposed method is provided as such. Again, reference is made to all explanations given before.

It can be essential, that the electronic process control 16 is designed for performing the proposed method by controlling at least the switchable valve units $n_{x,y}$ and the liquid pumping arrangement 15.

The electronic process control 16 may be implemented as a central unit controlling all or at least most of the components of the bioprocess installation 2. The electronic process control 16 may also be implemented in a decentralized structure, comprising a number of decentralized units. In some embodiments, the electronic process control 16 is individually adjustable and/or programmable and/or comprises at least one microprocessor on which software may be run. All explanations given before are fully applicable to this teaching.

In some embodiments, the electronic process control 16 comprises a data processing system for the carrying out the above noted method, such as comprising a local data storage and a local processor unit.

Finally, various embodiments are directed to a computer program product for the electronic process control 16 and to a computer-readable storage media, on which the computer program product is stored, such as in a non-volatile manner. All explanations given before are fully applicable to these teachings.

The invention claimed is:

1. A method for operating a chromatography setup of a bioprocess installation for performing a chromatography process, wherein the chromatography setup comprises a plurality of chromatography columns and a valve switching cassette, each of the plurality of chromatography columns comprising a column inlet and a column outlet, wherein the valve switching cassette comprises a group of inlet ports, a group of outlet ports, a group of column-in ports, a group of column-out ports, and internal liquid lines, wherein each port is communicating with an assigned internal liquid line of the internal liquid lines within the valve switching cassette, wherein the valve switching cassette comprises an array of switchable valve units, which are selectively interconnecting the internal liquid lines for carrying out the chromatography process, wherein the chromatography setup comprises a liquid pumping arrangement assigned to the valve switching cassette and an electronic process control for controlling at least the switchable valve units and the liquid pumping arrangement, wherein a first liquid stream of concentrated buffer is introduced into a first internal liquid line via a first inlet port and that a second liquid stream of diluent is introduced into a second internal liquid line via a second inlet port, that in a dilution process, the array of valve units is switched as to create a third liquid stream by merging the first liquid stream and the second liquid stream at a merging location within the valve switching cassette.

2. The method according to claim 1, wherein the switchable valve units and the liquid pumping arrangement are being controlled by the electronic process control as to create a predefined target dilution factor in the third liquid stream.

3. The method according to claim 1, wherein the liquid pumping arrangement comprises a first pump driving the first liquid stream and a second pump driving the second liquid stream and that both pumps are selectively controlled by the electronic process control as to create the target dilution factor in the third liquid stream.

4. The method according to any claim 1, wherein a first set of the internal liquid lines and a second set of the internal liquid lines are arranged in two planes of the valve switching cassette, wherein the valve units of the valve switching cassette are arranged as to selectively interconnect an internal liquid line of the first set and an internal liquid line of the second set.

5. The method according to claim 4, wherein the valve units are each communicating with an internal liquid line of the first set and with an internal liquid line of the second set as to selectively interconnect those internal liquid lines.

6. The method according to claim 4, wherein the first liquid stream and the second liquid stream each proceed in a separate internal liquid line of the first set, that the first liquid stream and the second liquid stream are introduced into one and the same internal liquid line of the second set by switching corresponding valve units, such that this internal liquid line of the second set provides the merging location and that the merging location defines the starting point of the third liquid stream.

7. The method according to claim 1, wherein the third liquid stream comprises an internal stream through one or more of internal liquid lines within the valve switching cassette.

8. The method according to claim 1, wherein the stream length of the third liquid stream is larger than a minimum merging length and that the minimum merging length is being derived from a dilution model, and/or, that the stream length of the third liquid stream is larger than the length that corresponds to a minimum merging time and the flow rates of the pumps of the liquid pumping arrangement.

9. The method according to claim 8, wherein complying with the minimum merging length and/or the minimum merging time ensures the stable creation of the target dilution factor at the end of the third liquid stream.

10. The method according to claim 8, wherein the dilution model represents the interdependence between the minimum merging length on the one hand and the flow rates of the pumps and/or the ratio of the flow rates of the pumps and the target dilution factor on the other hand, and/or, that the dilution model represents the interdependence between the minimum merging time on the one hand and the flow rates of the pumps and/or the ratio of the flow rates of the pumps and the target dilution factor on the other hand.

11. The method according to claim 1, wherein the electronic process control comprises a human-machine interface to input the target dilution factor and/or to output the minimum merging length, in particular the length of the respective external liquid line for the third liquid stream.

12. The method according to claim 1, wherein the chromatography process is a multi-column chromatography process, in particular a simulated moving bed chromatography process.

13. The method according to claim 1, wherein the chromatography setup comprises a sensor arrangement with at least one sensor providing sensor values, which are being transmitted to the electronic process control, which sensor values represent the actual dilution factor of the third liquid stream at a measuring position.

14. The method according to claim 1, wherein the chromatography setup comprises a bypass line, set up to provide an internal liquid line for a liquid stream to circumvent at least one chromatography column and that in a prime process, the third liquid stream is guided through the bypass line.

15. The method according to claim 14, wherein during a running process of one of the chromatography columns, the third liquid stream is guided through the bypass line, and subsequently guided through a column line leading to the respective chromatography column.

16. The method according to claim 15, wherein the electronic process control switches from the bypass line to the column line, after the sensor arrangement detected a stable value for the actual dilution factor at the end of the bypass line.

17. A chromatography setup for performing the method according to claim 1.

18. An electronic process control of the chromatography setup according to claim 17.

19. The electronic process control according to claim 18, wherein the electronic process control comprises a data processing system for carrying out the method.

20. A computer program product for the electronic process control according to claim 18, the computer program product stored on a non-volatile computer readable storage media.

* * * * *